(No Model.) 6 Sheets—Sheet 1.

G. W. CABLE.
MACHINE FOR STRIPPING AND STEMMING TOBACCO LEAVES.

No. 491,871. Patented Feb. 14, 1893.

Fig. 1.

Witnesses
J. Staib
Chas H Smith

Inventor:
George W. Cable
per Lemuel W. Serrell
Att.

(No Model.) 6 Sheets—Sheet 2.
G. W. CABLE.
MACHINE FOR STRIPPING AND STEMMING TOBACCO LEAVES.

No. 491,871. Patented Feb. 14, 1893.

(No Model.) 6 Sheets—Sheet 3.
G. W. CABLE.
MACHINE FOR STRIPPING AND STEMMING TOBACCO LEAVES.
No. 491,871. Patented Feb. 14, 1893.

(No Model.) 6 Sheets—Sheet 4.

G. W. CABLE.
MACHINE FOR STRIPPING AND STEMMING TOBACCO LEAVES.

No. 491,871. Patented Feb. 14, 1893.

(No Model.) 6 Sheets—Sheet 6.
G. W. CABLE.
MACHINE FOR STRIPPING AND STEMMING TOBACCO LEAVES.
No. 491,871. Patented Feb. 14, 1893.

Fig. 13.

Witnesses:
J. Staib
Chas H. Smith

Inventor:
George W. Cable
per Lemuel W. Serrell
Atty.

UNITED STATES PATENT OFFICE.

GEORGE W. CABLE, OF NEW YORK, N. Y., ASSIGNOR TO HIMSELF, AND J. TURNER MOREHEAD, OF LEAKSVILLE, NORTH CAROLINA.

MACHINE FOR STRIPPING AND STEMMING TOBACCO-LEAVES.

SPECIFICATION forming part of Letters Patent No. 491,871, dated February 14, 1893.

Application filed April 13, 1892. Serial No. 429,005. (No model.)

*To all whom it may concern:*

Be it known that I, GEORGE W. CABLE, a citizen of the United States, residing in the city and State of New York, have invented an Improvement in Machines for Stripping and Stemming Tobacco-Leaves, of which the following is a specification.

An application Serial No. 331,406 having been filed by me November 25, 1889, representing the same machine as the present, the combination of means for feeding the leaves, grippers for seizing the stems and means for tearing off the leaves from the stem are not broadly claimed herein.

The object of this invention is to rapidly separate the stem of the leaf from the thinner portion of such leaf by a tearing or pulling operation similar to that made use of in stripping the stem from the leaf by hand. The tobacco leaves are placed upon a conveying belt and the pointed ends of the leaves are passed into the machine beneath a tension brush that tends to lay the leaves out flat and the leaves are caught by conveying bars having pins so that the stems of the leaves rest upon the surface of the cylinder and between guides or fingers that hold up the thinner portions of the leaves and there are hooks that are beneath the fingers and receive a quarter rotation, so as to cut into the leaves above the stems and then such hooks are drawn down toward the surface of the cylinder and clamp the stems thereto and as the hooks of the advancing range of hooks are drawn down to the surface of the cylinder a knife cuts the stems off leaving the fine ends of such stems in the leaves and the advancing ends of the leaves are raised upwardly and carried off from the cylinder by a stripping apparatus while the stems remain upon the surface of the cylinder and are carried down by the hooks, after which the hooks are opened and the stems allowed to drop away and the guide fingers and hooks come around and receive another set of leaves and the operations are repeated.

In the drawings Fig. 6 is a section of one of the chain pulleys and chain and elevation of one of the conveying bars. Fig. 7 shows the cams at one end of the cylinder. Fig. 8 is a section and Fig. 9 a plan view of the cam that raises the platform.

The frame-work made use of is to be of any suitable size and character adapted to the other parts of the machine the side frames A being connected by the cross bars or columns 2 and upon the frame are bearings for the axis B' of the cylinder B. This cylinder B may be of any suitable material. I have however represented the same as of wood with the surface properly recessed for the reception of the parts hereinafter designated. The belt C passes around suitable rollers, one of which is shown at C' and this feeding belt C is of any suitable material, preferably of cross bars united at their ends by chain links and upon this feed belt the tobacco leaves are to be laid, preferably by hand and in ranges, a range of such leaves occupying the width of the belt or nearly so and being laid with their points toward the roller C' and in such position that the said leaves may be carried into the machine by the conveying bars next described.

Figure 3:
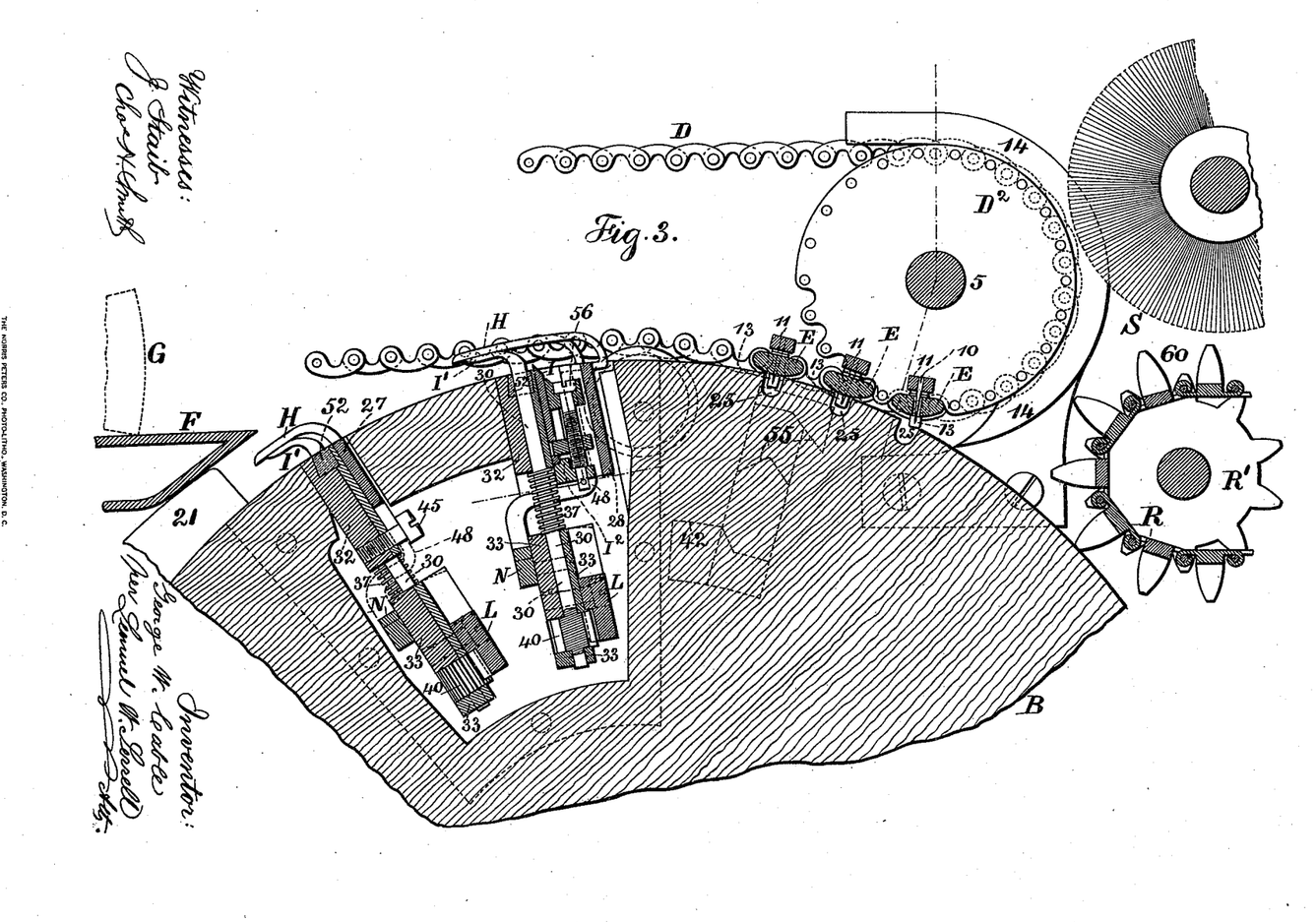
Fig. 3 is a section in larger size showing parts of the cylinder and the belts as more fully explained hereinafter.
Figures 6, 7, 8, 9:
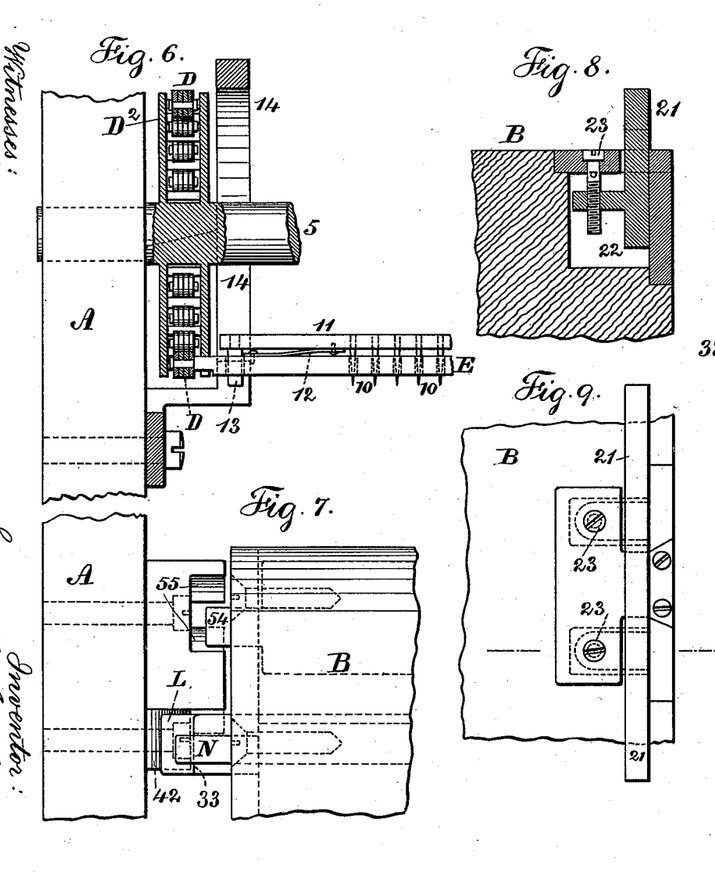
Figure 10:
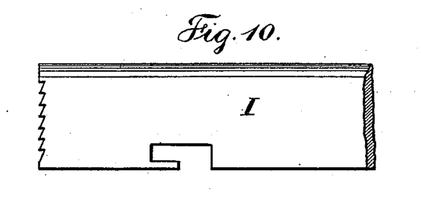
Fig. 10 is an elevation of one end of the knife.

Endless chains D D are passed around the pulleys D' D², the shafts 4 and 5 of which are supported in suitable bearings in the frame A and the shaft 5 is preferably driven by a gear wheel 6 receiving its motion from the gear 7 on the axis B' of the cylinder B so that the chains D are moved progressively as the cylinder B and the parts therewith connected are rotated by any suitable power. The conveying bars E pass across from one endless chain D to the other and they are attached at their ends to such chains and they are parallel to each other and parallel to the axis of the cylinder B and they are adapted to seize and draw along the tobacco leaves. Each of these conveying bars E is made of two parts as illustrated in Figs. 3 and 6 there being holes through the conveying bar E for the passage of the pins 10 that are connected to the secondary bar 11 so that by moving the secondary bar 11 the pins can be drawn up and their points will be within the bar E and a movement is given to the secondary bar 11 to project or withdraw the pins 10 by any suitable means. I have shown the springs 12 as tending to draw the secondary bar 11 toward the conveying bar E and thereby project the points of the pins below the conveying bar E and studs 13 fastened to the secondary bar 11 and passing through holes in the conveying bar E and acted upon by the cam 14 so that as the conveying bars pass along with the chains D and arrive in succession at the chain drum D² the cams 14 (one at each end of the conveying bar) act against the studs 13 and press the secondary bar upwardly drawing the pins up into the conveying bar so that such pins will no longer retain their hold upon the tobacco leaves as such leaves are delivered as hereinafter indicated, and during the other portions of the movement of the endless chains and conveying bars the pins project from the surface of the conveying bars E and when such conveying bars E pass around the chain pulleys D' and act above feeding belt C such pins stick into the ends of the tobacco leaves as they lie in a range upon such feeding belt C and such pins carry in the range of tobacco leaves above the platform F and beneath the tension brush G, which tension brush is raised as the conveying bars pass beneath it and falls upon the leaves to straighten them to a moderate extent as such leaves are drawn along upon the platform F and beneath the said tension brush G. The tension brush G has a shaft 15 forming a head piece for such brush, and this shaft 15 is free to turn in bearings upon the frames A and there is an arm G' and weight by which the brush is turned in order that the brush may press with the desired force upon the tobacco leaves as they are drawn along beneath it. This weight can be set at a greater or less distance from the shaft 15 to exert more or less force or a spring may be employed in place of the weight. There is an arm 18 projecting from the shaft 15 toward the axis B' of the cylinder B and around such axis B' is a cam 19 preferably a shell cam which acts against the end of the arm 18 to hold up such arm and to hold up the ends of the tension brush during the time that the conveying bars E pass along beneath the same and such cam 19 passing from beneath the arm 18 as the conveying bars move beyond the brush, allows the brush to drop and rest upon the tobacco leaves as aforesaid.

The platform F is pivoted at 20 adjacent to the feeding belt C and the other end of such platform is raised by the cams 21 upon the cylinder B, and this cam 21 is a segment of a circle and holds the platform up at the proper time for the guide fingers hereinafter described to pass along beneath the edge of such platform F and this cam 21 is provided with arms 22 passing into the cylinder B and acted upon by screws 23 as seen in the section Fig. 8, so that such cam 21 may be projected more or less from the surface of the cylinder and hence such platform F will be raised to whatever extent is desired for properly holding the tobacco leaves as they pass between the tension brush G and the platform F and are drawn along by the pins of the conveyer bars E; and in order to render these conveyer bars and pins more efficient the cylinder B is grooved at 25 so that the pins of the conveyer bars pass into such grooves and the conveyer bars are pressed firmly against the surface of the cylinder B by the action of the endless chains and pulleys as illustrated in Fig. 3.

By holding the ends of the leaves firmly by the conveyer bars E against the surface of the cylinder B and applying a tension to the leaves by the brush G and platform F as such leaves are drawn along between the platform and the tension brush, the stems of the leaves are under tension and lie upon the surface of the cylinder B while the thin portions of the leaves are held up by the guides or fingers H next described, which guides or fingers are sufficiently far apart for the stems to pass in freely between them and the fingers are in two or more ranges across the cylinder, the ranges being parallel with the conveying bars E while the fingers themselves are at right angles to the ranges, so that the stems draw in between such fingers. I prefer to use two ranges of such fingers and hooks for holding the stems down upon the surface of the cylinder. These parts being constructed and operating as next described.

As before mentioned there are two ranges of guides or fingers H and these guides or fingers point backwardly and the forward ends are curved downwardly and connected to the cross bars 27 28 and the guide fingers which are connected to the cross bar 28 are longer than those that are connected to the cross bar 27 in order to provide the necessary space for the introduction of a knife I which is used for cutting off the stems near the forward ends of the leaves as hereinafter stated in order that the points of the leaves containing the thin membrane of the stems may be raised up and delivered with the other thin portions of the leaves.

Beneath each guide finger is a clamping hook I' and such hook is at the end of a shaft 30 occupying a radial position in the cylinder B and to this shaft an endwise movement is given and also a quarter rotation and the end of the hook is made as a cutting edge, the object being to clamp the stems as they lie between the guide fingers and upon the surface of the cylinder B and the parts are constructed as hereinafter described so that at the time the stems are drawn forcibly down between the guide fingers H as heretofore stated the hooks I' are close up against the under sides of such guide fingers and then such hooks receive a quarter rotation and are turned from one guide finger to the next and cut through the leaf portions of the tobacco above the stems and then the shafts of the hooks are moved toward the axis of the cylinder B in order that the hooks may clamp the tobacco stems against the surface of the cylinder and hold such stems while the tobacco leaves are being drawn off from such stems and delivered from the machine.

The mechanism for giving to the shafts 30 a quarter rotation and for moving the clamping hooks toward and from the surface of the cylinder B may be of any desired character and I have represented two ranges of these clamping hooks one for each range of guide fingers and as the construction and mode of operation of the devices that give motion to these ranges of guide fingers are the same in both ranges it is only necessary to describe one of such ranges. The shafts 30 pass through the bars or supports 32 that are permanently fixed in the cylinder B and parallel with the axis thereof and they also pass through the cross bars 33 the ends of which project through slots in the plates 34 that are at the ends of the cylinder B and these cross bars 33 and the parts carried by them, together with the ranges of shafts 30, are moved away from the axis of the cylinder B by stationary inclines 36 upon the frames A that push the cross bars 33 away from said axis as the parts rotate, and there are springs 37 around some of the shafts 30 which give end motion to the shafts 30 and move the cross bars 33 and draw the clamping hooks I' toward the surface of the cylinder B when such cross bars 33 are not otherwise acted upon.

Figure 4:
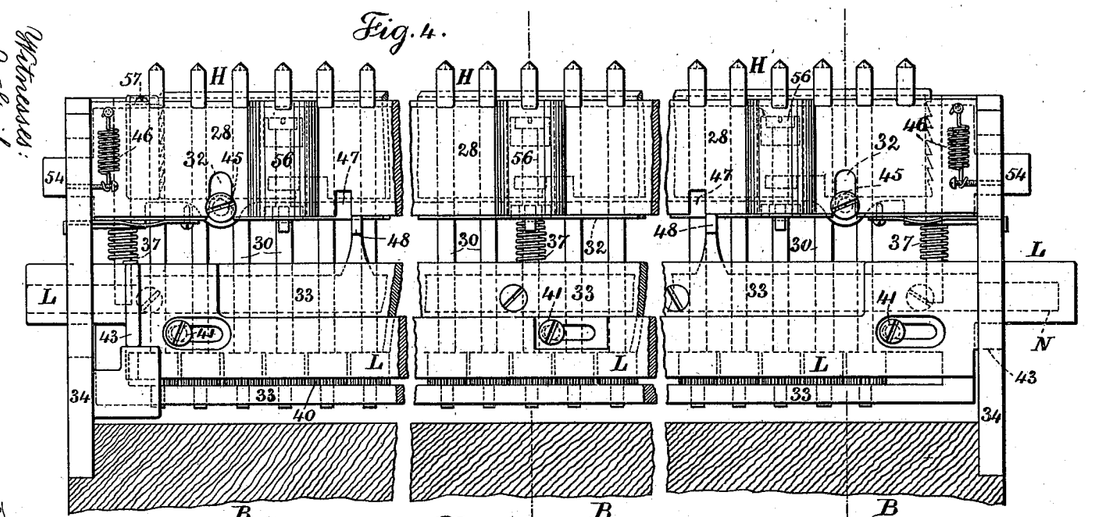
Fig. 4 is an elevation of the knife, fingers and actuating device for the hooks with a portion of the cylinder in section in a plane parallel to the axis.

The cross bars 33 are made in two parts, or with openings, within which are the pinions 40 upon the shafts 30 and against the sides of the bars 33 are the rack bars L connected to such cross bars 33 by the screws 41 passing through slots in such rack bars, and adjacent to the pinions 40 are teeth upon the rack bars, so that when such rack bars receive an endwise motion the pinions and the shafts 30 and clamping hooks receive a quarter rotation first in one direction and then in the other, but the rack bars L being fastened to the cross bars 33 move bodily and laterally with such cross bars 33 and upon the frame A are inclined planes or cams 42 and 50 that give to the rack bars L end motion first in one direction and then in the other direction and there are upon the rack bar L offsets or latches 43, which when the parts are in the position represented in Fig. 4 hold the cross bar and rack bar with the clamping hooks projected but as soon as the inclines or cams 42 give end motion to the rack bar L the latches 43 slide off their supports and allow the springs 37 to force the cross bar 33 toward the axis of the cylinder B and in so doing the shafts 30 are drawn endwise through the bars 32 and the clamping hooks are brought down upon the stems of the tobacco over which such clamping hooks have been turned by the one quarter rotation given to them by the end movement of the rack bar turning the pinions 40.

Figure 5:
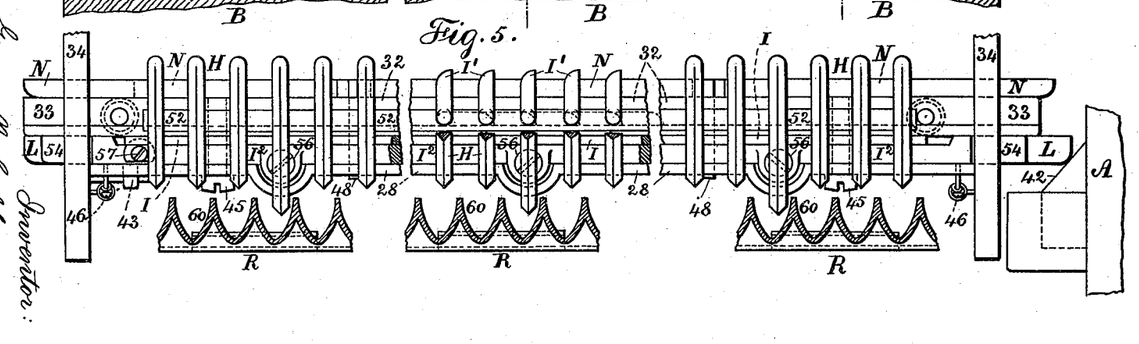
Fig. 5 is a plan view showing detached parts of the fingers hooks and stripper belt, the latter being in section to show its relative positions to the fingers.
Figure 11:
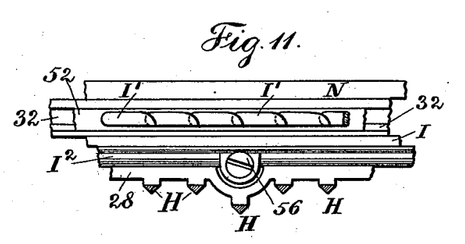
Fig. 11 is a plan of some of the clamping hooks.
Figure 12:
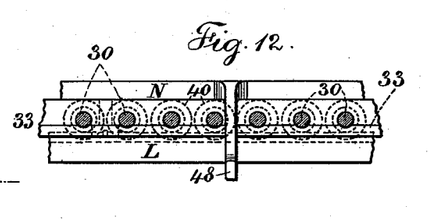
Fig. 12 is a section through the shafts of the clamping hooks.
Figure 13:
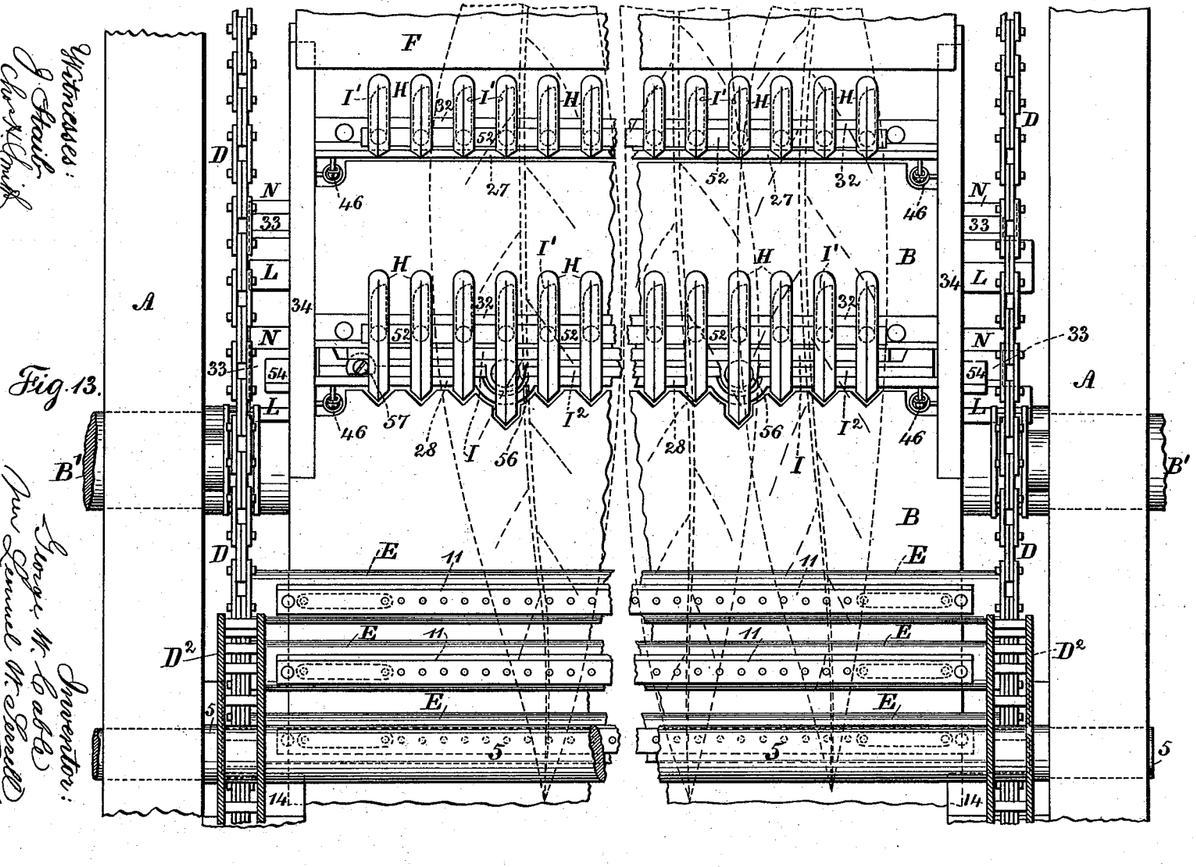
Fig. 13 is a partial plan view of the cylinder, the guide fingers with conveying bars and the position of the leaves and stem to the fingers by dotted lines.

The cross bars 27 and 28 to which the ranges of guide fingers H are fastened are held in position by screws 45 passing through slots in the respective cross bars so that the cross bars are free to be moved bodily toward and from the axis of the cylinder B and the springs 46 tend to draw the cross bars inwardly, and such cross bars are moved outwardly along with the clamping hooks, because when such clamping hooks have received their quarter rotation they are in line with each other or nearly so as shown in Fig. 11 and indicated by dotted lines in Fig. 5 and the point of one hook reaches to the shaft of the next hook, hence they form a nearly continuous line of clamping hooks beneath and at right angles to the guides or fingers H and when the shafts 30 of such clamping hooks receive an endwise movement outwardly the clamping hooks acting against the inner faces of the guide fingers lift such guide fingers away from the surface of the cylinder and move the cross bars 27 and 28 outwardly. In these cross bars 27 and 28 are notches 47 and there are holding fingers 48 upon the bars N and these bars N are supported near their ends by the end plates 34, and such bars N can be moved endwise in order that the fingers 48 may come beneath the under edges of the respective cross bars 27 28, as seen in Fig. 4, and thereby hold the cross bars and guide fingers in their projected positions, or when such bars N receive an endwise movement the fingers 48 coincide with the notches 47 and allow the springs 46 to draw the respective bars 27, 28 inwardly and the cams 42 and 50 upon the frame A give end motion at the proper times to the bar N first in one direction and then in the other.

It is generally preferable to introduce rubber strips 52 at the surface of the cylinder B and adjacent to or in line with the ranges of shafts 30 so that the tobacco stems will be held by the clamping hooks I' against the surfaces of these rubber strips 52 and in order that the knife I may be made to operate at the proper time such knife I is fastened to a stock I$^2$, the end pieces 54 of which project through the plates 34 and there are cams 55 upon the frame A near the chain pulleys D$^2$ so that such knife I is projected and cuts off the tobacco stems when such knife arrives at the pulleys D² or nearly so, and then such knife is drawn in again in consequence of the cams 55 being V-shaped.

It is preferable to make use of adjusting screws 56 to regulate the position of the edge of the knife I, and such knife may be easily removed for grinding when necessary and it is advantageous to make use of serrations on the knife and a clamping piece held by the screw 57 for retaining the knife in the stock I². It will be noticed in Fig. 5 that the cross bar 28 is bowed outwardly at places to give the necessary space for introducing the adjustable screws 56.

Figure 1:
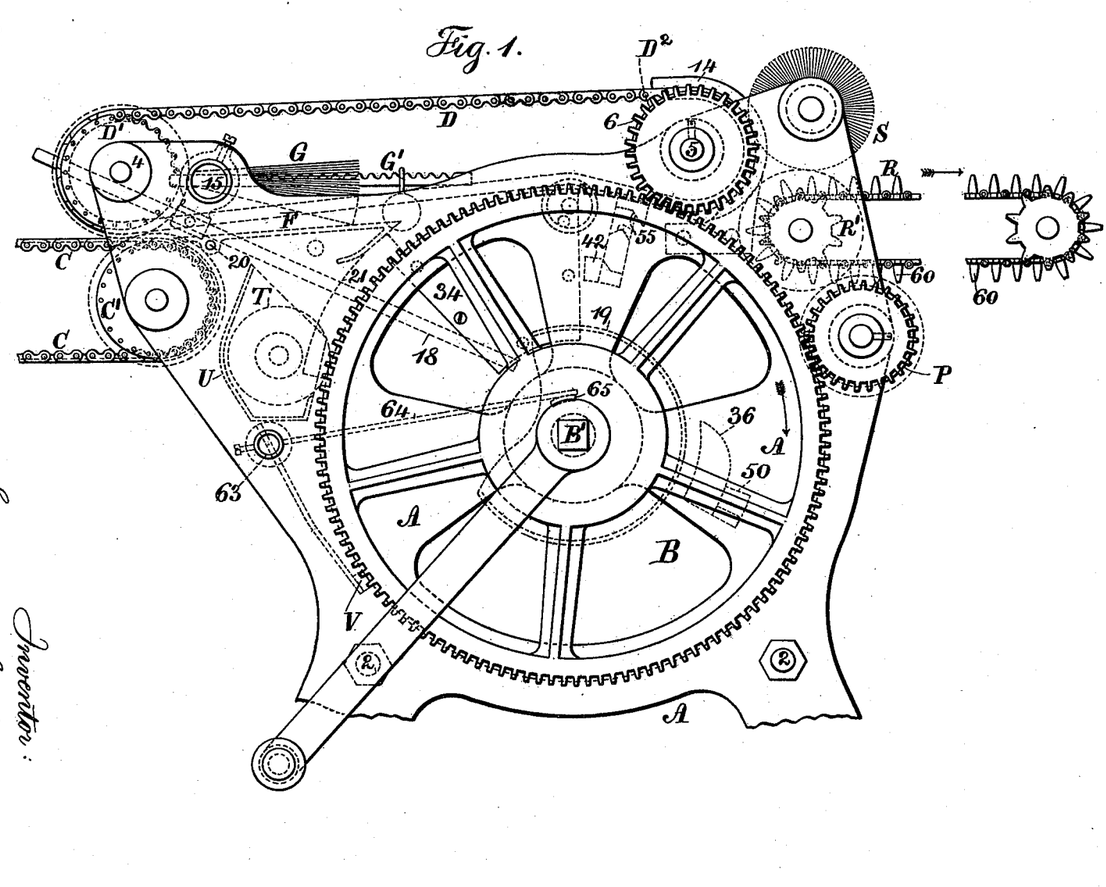
Figure 1 is a general elevation of the machine at one side thereof, the feeding and delivery belts being broken off.
Figure 2:
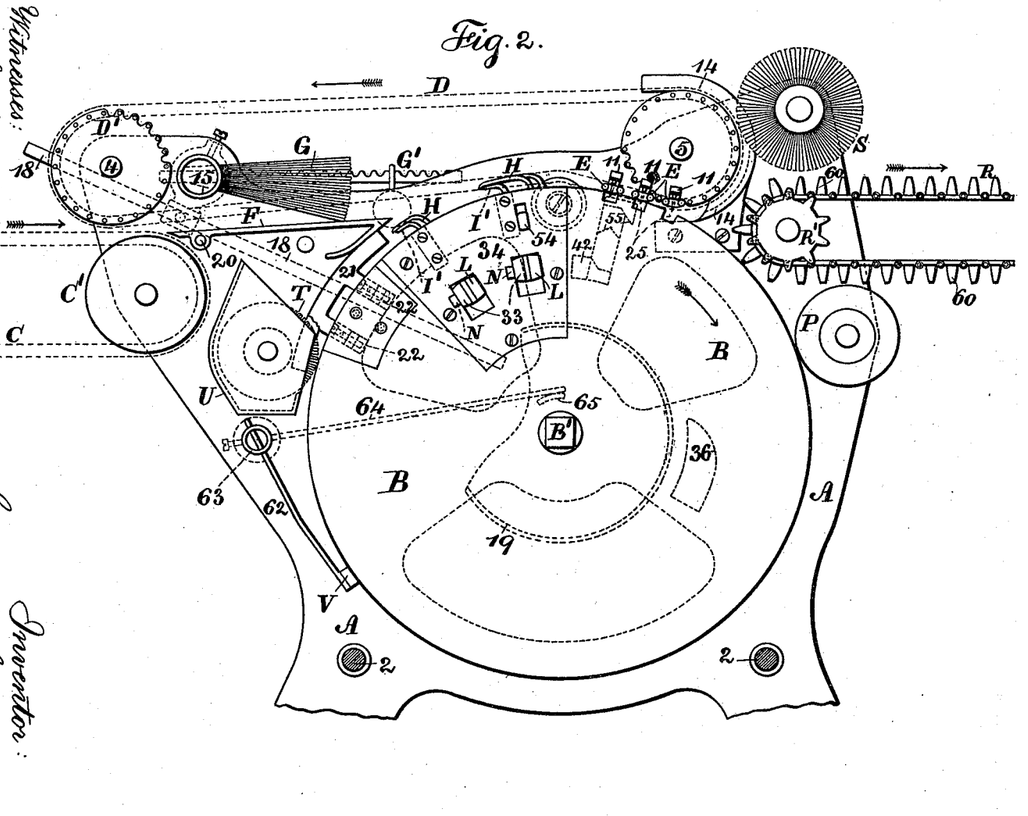
Fig. 2 is an elevation of the parts with the frame and gearing removed.

The successive operations of the parts before described will be apparent, presuming that the parts are in the position shown in Fig. 2 and that the leaves of tobacco are held at their ends by the conveying bars E and that tension is applied by the brush G, so that the stems are drawn down between the guide fingers H and as the cylinder B moves in the direction indicated by the arrow the inclined cams 42 first act to give end motion to the rack bar L and the pinions 40 and shafts 30 are rotated bringing the front range of clamping hooks I' over the stems as they lie between the guide fingers H. The latches 43 cease to hold the bar L and the springs 37 now act to force the cross bar 33 downwardly and move the shafts 30 endwise and clamp the stems by the hooks I'. The cams 42 now act upon the cross bar N moving the fingers 48 into line with the notches 47 so that the springs 46 pull down the front range of guide fingers H, the knife I and stock I² are moved by the cams 55 and the stems separated at their forward ends and by this time the second range of clamping hooks has been brought into action in the same way as the first range, to take an additional hold upon the stems, and then the second range of guide fingers upon the cross bar 27 is brought down toward the surface of the cylinder B so that such guide fingers no longer hold up the thin portions of the tobacco leaves and the stems are securely held and carried around with the cylinder B while the leaves are removed by the devices hereinafter described; and I remark that it is preferable to make use of a rubber roller P running in contact with the stems and pressing them toward the surface of the cylinder B so that such stems cannot escape during the operation of pulling off the leaves from the stems and the cams 36 and 50 that restore the parts to their normal positions act upon such parts after the stems have passed between the roller P and the surface of the cylinder B and the stems fall away after their rear ends have passed the rubber roller P.

The devices heretofore described for supplying and drawing the tobacco leaves through the machine are not necessarily limited to any particular stripping and delivery devices, but I prefer to make use of an endless belt R passing over suitable pulleys, one of which is shown at R' and this endless belt is made of ranges of wipers 60 hinged together and these wipers are preferably made with hollow projecting teeth as represented in Fig. 3, and sectionally in Fig. 5.

In order to strip the leaf portions from the stems it is necessary to raise up such leaf portions and tear them away from the stems as closely as possible to avoid loss of tobacco. To effect this object the projecting delivery wipers are made with nearly parallel sides at the ends to scrape against the sides of the stems in separating the leaves from the stems without cutting such stems, and the spaces between the wipers are sufficiently wide to prevent the stems becoming wedged into such spaces, and it is preferable to have the wipers in line or nearly so with the fingers H, so as to act at each side of the stems as such stems lie between the fingers. If the surface of the cylinder B is recessed beneath each finger in the ranges of fingers, then the wipers 60 may be in line with the fingers, but when the fingers H lie upon the surface of the cylinder B the wipers should be slightly out of line with the fingers as seen in Fig. 5, to act adjacent to the sides of such fingers in raising up the leaves and separating them from the stems.

By rotating the endless belt R in the direction indicated by the arrows the ends of the wipers raise up the tobacco leaves and strip them from the stems, and the leaves rest upon the endless belt and are carried by the same out of the machine, and in order to prevent the leaves being unnecessarily torn by remaining in contact with the pins of the conveying bars E or adhering to such conveying bars E I make use of a rotary brush S with which the bars E come into contact and between which and the endless belt the tobacco leaves are discharged. This rotary brush should receive a rotation so that the surface speed will correspond or nearly so to that of the delivery belt.

The tobacco is generally in a moist condition at the time the stem is removed, and hence the parts of the machine are liable to become sticky or adhesive. I prefer to make use of a rotary brush T and water vessel U beneath the platform F, such brush being moistened by the water and acting to remove from the guide fingers and the clamping hooks any particles of tobacco or gummy material that may adhere to them and at the same time the surfaces of the cylinder B and other parts are brushed and kept clean and in a moist condition and as an additional protection to avoid any stems adhering to the surface of the cylinder B, the rubber V is provided at the end of a spring arm 62 upon a shaft 63 with an arm 64 to a cam 65 upon the shaft of the cylinder B so that such rubber V is brought into contact with the surface of the cylinder at the proper time for scraping or rubbing off any pieces of stems that may adhere to the same.

I claim as my invention.

1. The combination with a feeding belt and a revolving cylinder, of conveying bars, endless chains and pulleys for such conveying bars, a platform between the feeding belt and the cylinder and a tension brush acting in connection with the platform for applying the necessary detaining force to the tobacco leaves as they are drawn into the machine, substantially as set forth.

2. In a tobacco stripping machine, the cylinder B, in combination with the conveying bars, the endless chains and pulleys for the same, the pins projecting through the conveying bars and secondary bar to which the pins are attached, and means for moving the secondary bar and withdrawing the pins, the platform intervening between the feeding belt and the cylinder, a tension brush above the platform, a weight for applying the proper tension to the brush and an arm and cam for raising such brush as the conveying bars pass beneath the same, substantially as set forth.

3. In a tobacco stripping machine, the combination with the revolving cylinder for carrying the tobacco leaves through the machine, of a range of fingers projecting above the surface of the cylinder for holding up the thin portions of the leaves, a range of clamping hooks contiguous to such fingers and shafts for the same, pinions and a rack bar for giving a partial rotary motion to such clamping hooks to turn them over the stems and springs for applying pressure by the hooks upon the stems, substantially as set forth.

4. The combination in a machine for stemming tobacco, of a revolving cylinder for conveying the tobacco through the machine, a range of fingers projecting from the surface of such cylinder for holding up the thin parts of the leaves and allowing the stems to pass in between the fingers, a range of clamping hooks contiguous to the fingers and mechanism for partially rotating such hooks and for moving the same to clamp the stems and a knife for separating the advancing ends of the stems in front of the clamping hooks, substantially as set forth.

5. In a tobacco stemming machine the combination with the cylinder for carrying the leaves through the machine, of a range of fingers projecting from the cylinder, a bar within the cylinder for supporting such fingers, springs for drawing the fingers toward the cylinder, a range of clamping hooks adjacent to the fingers, shafts for such hooks, cross bars for supporting the shafts, pinions and a rack bar for partially rotating the shafts and hooks, stationary cams at the ends of the cylinder for moving the rack bar, springs for forcing the hooks toward the surface of the cylinder and latches for holding the cross bar and clamping hooks when the latter are raised from the surface of the cylinder, substantially as set forth.

6. The combination with the cylinder B, of the guide fingers projecting from the surface of the cylinder, a cross bar within the cylinder to which the guide fingers are connected, springs for moving the cross bar and drawing the guide fingers toward the surface of the cylinder, holding fingers for the cross bar and a bar and cam for sustaining and giving motion to the holding fingers, substantially as set forth.

7. The combination with the cylinder B, guide fingers projecting from its surface and a cross bar supporting such fingers, of clamping hooks adjacent to the fingers and mechanism substantially as specified for giving motion to the clamping hooks, a knife in front of the clamping hooks, knife stock and cams for giving motion to the knife and causing the same to cut the advancing ends of the stems, substantially as set forth.

8. The combination with the cylinder B and feeding belt, of the platform F pivoted to the frame of the machine and with the moving end adjacent to the cylinder, a cam for raising such platform, a tension brush over the platform and pivoted upon the frame of the machine, an arm and cam for moving the same, conveying bars, chains and pulleys for moving the conveying bars over the platform and in contact with the cylinder, guide fingers upon the cylinder, clamping hooks adjacent to the guide fingers and mechanism substantially as specified for giving motion to the same and a knife in front of the hooks for severing the stems adjacent to the clamping hooks, substantially as set forth.

9. The combination in a machine for stemming tobacco leaves, of a cylinder and fingers projecting from such cylinder and between which the stems pass, clamping hooks adjacent to the fingers and mechanism substantially as specified for giving motion to such hooks and causing them to hold the stems, a knife adjacent to the clamping hooks for severing the stems and a delivery belt with wipers acting to remove the leaves from the stems as such stems remain in contact with the cylinder, substantially as set forth.

10. In a machine for stemming tobacco, the combination with the cylinder for carrying the leaves through the machine and hooks for holding the stems, of a delivery belt running adjacent to the surface of the cylinder and having ranges of wipers acting to raise and convey away the tobacco leaves, substantially as set forth.

11. In a machine for stemming tobacco leaves, the combination with the cylinder for conveying the leaves through the machine and hooks thereon for holding the stems, of an endless belt and ranges of wipers running contiguous to the surface of the cylinder for delivering the leaves from the machine, and a rotary brush between which and the belt the leaves pass as delivered, substantially as set forth.

12. The combination with the revolving cylinder in a machine for stemming tobacco leaves, of clamping hooks upon such cylinder, for holding the stems, a delivery belt running contiguous to the surface of the cylinder for removing the leaves from the stems and discharging such leaves and an elastic roller acting with the revolving cylinder for passing the stems away from the leaves, substantially as set forth.

13. In a tobacco stemming machine the combination with the revolving cylinder for conveying the tobacco through the machine, of guide fingers projecting from the surface of the cylinder, clamping hooks adjacent to the fingers and mechanism substantially as specified for moving the hooks and holding the stems, a delivery belt running adjacent to surface of the cylinder for removing the leaves from the stems and a water vessel and brush for cleaning the surfaces of the cylinder, clamping hooks and guide fingers, substantially as set forth.

Signed by me this 8th day of April, 1892.

GEO. W. CABLE.

Witnesses:
GEO. T. PINCKNEY,
WILLIAM G. MOTT.